Figures 1, 2:
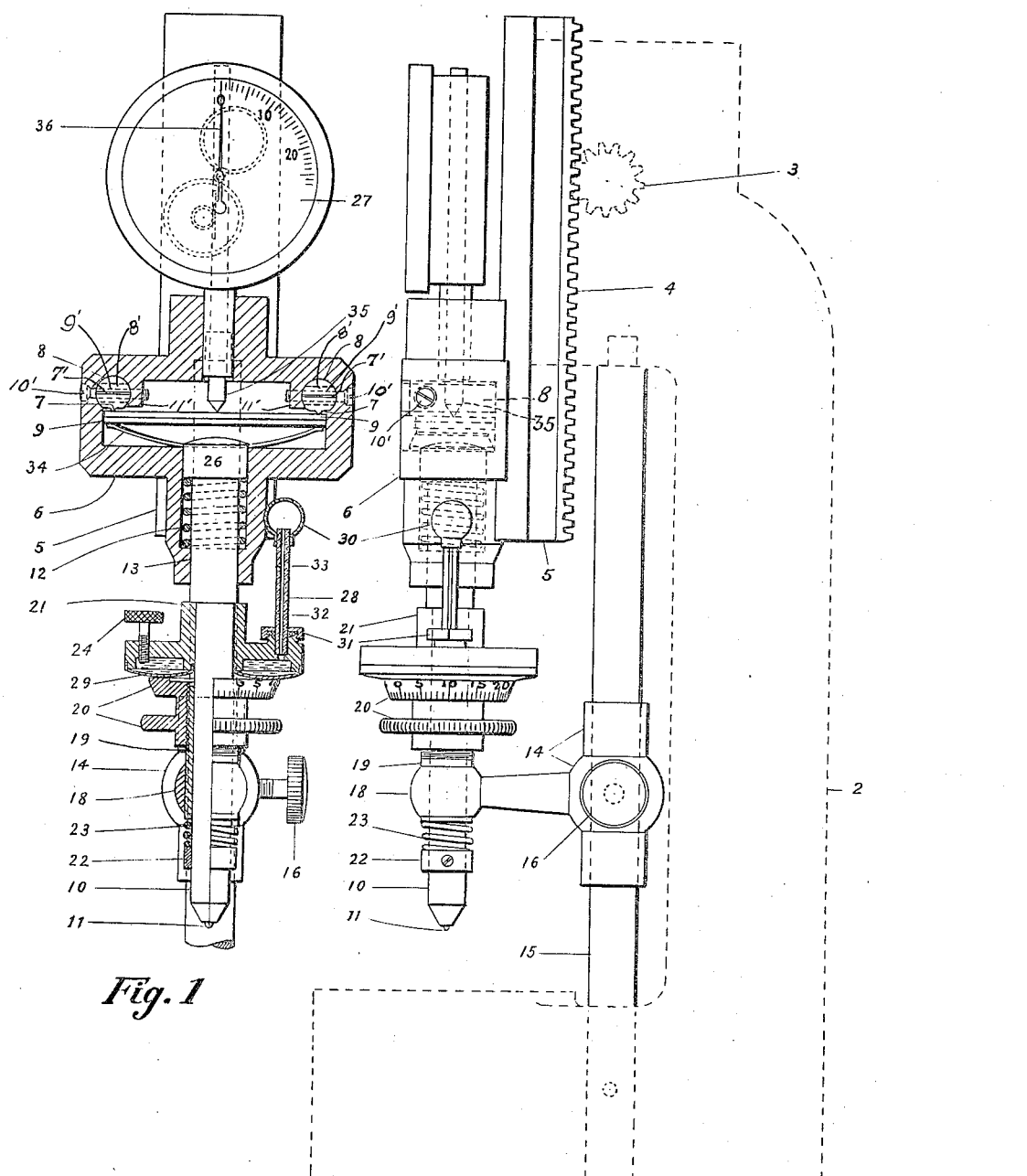

Patented July 8, 1930

1,770,045

UNITED STATES PATENT OFFICE

ALBERT F. SHORE, OF NEW YORK, AND CHARLES P. SHORE, OF HICKSVILLE, NEW YORK, ASSIGNORS TO THE SHORE INSTRUMENT & MFG. CO., OF JAMAICA, NEW YORK, A CORPORATION OF NEW YORK

APPARATUS FOR MEASURING THE HARDNESS OF MATERIALS

Application filed March 16, 1925, Serial No. 15,727. Renewed October 4, 1929.

This invention relates to improvements in apparatus for measuring or indicating the degree of penetration resistance of materials, and particularly the degree of penetration resistance or hardness of materials of the harder grade, whether of organic or inorganic nature.

The present invention is an improvement upon the device shown, described and claimed in a joint application of Albert F. Shore and William F. Shore, filed October 9, 1924, Serial No. 742,516, and is also an improvement upon a joint application of Albert F. Shore and Charles P. Shore, filed February 24, 1925, Serial No. 10,995. As in the latter application, it is the object of the present invention to provide a device of the class specified having a greater or increased range of sensitiveness, but which will be effective and accurate in the measurement of the penetration resistance of exceptionally hard substances, such as hardened steel. The method and means herein disclosed for accomplishing this purpose differ in certain respects from those now employed and have for their purpose the provision of an instrument or device adapted for measuring and indicating the degree of pressure required to effect indentation to a substantially fixed depth in various materials, the present improvement upon the means employed in the device of the first above-named application having been devised to provide an auxiliary super-sensitive depth of penetration device, whereas the improvement upon the second above-named application is in means for adjusting the separation distances of the knife-edged bearings for the plate-spring, and also in the use of an indentor-point in which the depth-measuring sleeve does not contact with the surface of the test specimen, but is supported by an auxiliary device which is locked into a position relative to said surface of the test specimen, after having brought the indentor-point into light contact with the said test specimen, so that when pressure is finally brought to bear upon the indentor-point, causing it to penetrate to the required degree—inasmuch as the sleeve has been previously fixed or locked relative to the test specimen surface, and a fixed collar on the indentor-bar thus approaching the said fixed sleeve with a micrometer unit interposed between—it will serve to measure the extent of movement of the fixed collar and indentor-stem, thus registering the extent of penetration.

The above mentioned and other features of the invention not hereinbefore referred to will be hereinafter described and claimed and are illustrated in the accompanying drawing, in which:

Figure 1 is a vertical cross-section partly in elevation of our device for measuring the hardness of materials; and Fig. 2 is a side elevation of the device.

Similar characters designate like parts in all the figures of the drawing.

Referring to the drawing, 2 designates a support or press-frame, 3 a pinion mounted thereon, and 4 a rack on the dove-tailed slide-bar 5, said slide-bar being adapted to permit connection thereto of a casing 6, having interior knife edges 7 formed on revolvable hardened cylindrical pieces or bearing members 8, at opposite ends of the plate-spring 9, which bearing members are designed for the purpose of permitting apporach or separation of said knife-edges relative to each other in order to provide adjustment of the length and consequently of the power of the plate-spring 9. This adjustment is brought about by turning either one or both of the cylindrical pieces 8 on their axes, which may be accomplished by inserting a screw-driver in the slots 7' in their respective ends. In order to clamp the cylindrical members 8 in their respective adjusted positions, each of these cylindrical members is provided with a transversely extending slot 8' and through each of these slots extends a clamping-rod 9', each terminating at its outer end in a screw-head 10' and at its other end is screw-threaded so as to engage the lug 11' which embraces the cylindrical member 8. It will be observed that there is a clearance about the rod 9' within the slot 8', so that the cylinders 8 may be rotated sufficiently to accomplish the adjustment referred to. In effecting such adjustment, the screw-rods 9' are turned so as to release the cylinders 8 from any clamping effect so that they may be easily adjusted and after such adjustment has been effected, the rods 9' are turned in the direction to tighten the lugs 11' against the cylinders 8 and thereby securely clamp them in position. Said spring 9 when flexed, communicates its pressure to indentor-bar 10, this pressure resulting from contact with the test specimen upon the downward thrust of the superhard indentor-point 11. Said spring 9 is normally out of contact with indentor-bar 10, as shown in the drawing, the indentor-bar being supported floatably by spring 12, or its equivalent, resting on shoulder 13 in a boss of the casing 6.

The object of this construction is to enable the operator to bring the indentor-point 11 into very light contact with the test specimens, particularly when they are very soft. Carried by the indentor-bar 10 is also the movable stop 14, sliding on a bar 15 fixed to the support or press-frame 2. The stop 14 is provided with a set-screw 16, adapting it to be locked to said bar 15. Stop 14 is provided at its offset end with an enlargement at 18, in which is fastened the depth-measuring sleeve 19, and its adjustable micrometer-collar 20 is normally held in light contact with a micrometer unit 29 held by a collar 21 fixed relatively to the indentor-bar 10. The collar 20 is provided with graduations. Below the enlarged extremity 18 and depth-measuring sleeve 19 is a collar 22 fixed to indentor-bar 10 by a set-screw. The collar 22 carries a spring 23 which is adapted to maintain contact between the adjustable micrometer-collar 20 and the micrometer-unit 29, and at the same time the spring 23 carries the slidable-stop 14 along with the indentor-bar when the latter is raised up and down in the clamping-frame 2, to accommodate specimens of varying thicknesses.

The operation is as follows: Having loosed locking set-screw 16 on slidable stop 14, the casing 6 is moved up and down through medium of pinion 3 and rack 4 on slide-bar 5 until the indentor-point 11 touches the surface of the test specimen with slight pressure or bare contact. It will be noted that indentor-bar 10 is then out of contact with plate-spring 9, it merely floating or being suspended on spring 12. Having thus brought indentor-bar 10 to rest, the slidable-stop 14 is fastened in position by the set-screw 16 on the bar 15 of the press-frame 2. The spring 23 normally maintains a pressure against the micrometer in the fixed collar 21, so that the micrometer is approximately at zero, indicated by the numeral 32. If the micrometer is not found at zero after fastening set-screw 16, it can readily be adjusted by micrometer-adjusting collar 20, or, in the event that a fluid cell and diaphragm is used, by the fluid-displacer screw 24. The machine is now set with its various parts in readiness for the test. This is performed as follows:

Casing 6 is moved downward further through medium of the pinion 3, so that plate-spring 9 will be brought to bear on contact-head 26 of the indentor-bar 10, pressure being applied until the micrometer in fixed collar 21 shows a predetermined depth value. The amount of pressure required to cause this fixed depth of penetration at point 11 is registered on the graduated dial 27 as the result of the flexure of the spring 9 communicated to said dial 27. Adjusting-screw 16 is then released preparatory to performing the next test.

We have shown in the foregoing, a device which measures the hardness in terms of pressure required to cause a predetermined amount of penetration, but the same device may be used to indicate and measure hardness values in terms of constant pressure and resulting variable depth of penetration in different materials, as by applying this pressure to spring 9 until indicator-hand 36 on dial 27 moves to a predetermined point. The variable amount of penetration will then be read from the micrometer interposed between fixed collar 21 on indentor-bar 10 and the adjustable micrometer-collar 20. In this instance, however, a more elaborate scale than provided by the fluid column 28, would be required, such, for example, as the use of a standard micrometer dial-indicator, or its equivalent, which is obtainable on the open market.

Located between the collar 21 and the micrometer-collar 20 is a fluid-pressure micrometer gage adapted for indicating and measuring the depth of penetration of the indentor-point 11 in the material under test. The diaphragm of said fluid pressure gage is designated by 29, a cap for the upper end of the micrometer-tube 28 by 30, and a fixing cap for holding said tube 28 to the collar 21 is designated by 31, the designations 32 and 33 showing low and high pressure indicating points, respectively, on the tube 28.

At 34 is shown a spring adapted for holding the plate-spring 9 firmly against the knife-edged bearings 7. 35 designates a stem adapted to move up and down in accordance with variations of pressure upon the plate-spring 9 to actuate the hand 36 on the dial 27 to indicate and measure variations of pressure.

What we claim is:

1. In a device of the class described, the combination with a press-frame, a casing adjustably carried thereby, an indentor-bar slidable in said casing and carrying an indentor-point, a plate-spring adapted to be actuated by means of said indentor-bar, and indicating mechanism adapted to be actuated by means of the plate-spring, of manually-operated means for increasing or decreasing the effective length of said plate-spring to vary its resistance, and means for securely fixing said last-named means.

2. In a device of the class described, the combination with a press-frame, a casing adjustably carried thereby, an indentor-bar slidable in said casing and carrying an indentor-point, a plate-spring adapted to be actuated by means of said indentor-bar, and indicating mechanism adapted to be actuated by means of the plate-spring, of knife-edge bearings for said plate-spring adapted to be moved toward or from each other to vary the effective rigidity of said spring, and means for clamping said bearings in fixed position.

3. In a device of the class described, the combination with a press-frame, a casing adjustably carried thereby, an indentor-bar slidable in said casing and carrying an indentor-point, a plate-spring adapted for actuation by said indentor-bar, and indicating mechanism adapted to be actuated by means of the plate-spring, of knife-edged bearing members for said spring at opposite ends thereof, said bearing members having screw-threaded means for fixing one or both of said bearing members in any desired position in relation to each other and to the said spring, respectively, and means for firmly holding said plate-spring against the knife-edged bearing members.

4. In a device of the class described, the combination with a press-frame, a casing adjustably carried thereby, an indentor-bar slidable in said casing and carrying an indentor-point, a plate-spring adapted for actuation by said indentor-bar and indicating mechanism adapted to be actuated by means of the plate-spring, of resilient means for floatably supporting said indentor-bar within the casing.

5. In a device of the class described, the combination with a press-frame, a casing adjustably carried thereby, an indentor-bar slidable in said casing and carrying an indentor-point, means for applying pressure to said indentor-point to bring the latter in the desired position relative to the material to be tested, and a micrometer gage responsive to variations of penetration movements of the indentor-bar, of a depth-measuring sleeve surrounding said indentor-bar, said sleeve having an adjustable micrometer-collar provided with graduations, and means for locking said sleeve at any desired height relative to the press-frame.

6. In a device of the class described, the combination with a press-frame, a casing movably carried thereby, an indentor-bar slidable in said casing and carrying an indentor-point, means for effecting movement of said casing in said press-frame to bring the indentor-point to any desired position relative to the material to be tested, and a micrometer fluid-gage responsive to penetration movements of the indentor-bar, of a movable stop having a portion in which said indentor-bar is slidable, a micrometer adjusting collar to position said stop with relation to the micrometer-gage, and means for clamping said stop on said press-frame.

7. In a device of the class described, the combination with a press-frame, a casing movably carried thereby, an indentor-bar slidable in said casing and carrying an indentor-point, means for applying pressure to said indentor-point to effect penetration thereof in the specimen under test, means for indicating the pressure thus applied, and means for indicating the depth of penetration of said indentor-point in said test specimen.

In testimony whereof, we affix our signatures.

ALBERT F. SHORE.
CHARLES P. SHORE.